(12) United States Patent
Takaki

(10) Patent No.: US 10,867,517 B2
(45) Date of Patent: Dec. 15, 2020

(54) CRUISE ASSIST METHOD AND APPARATUS FOR VEHICLE

(71) Applicant: DENSO CORPORATION, Kariya (JP)

(72) Inventor: Ryo Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 189 days.

(21) Appl. No.: 16/120,778

(22) Filed: Sep. 4, 2018

(65) Prior Publication Data

US 2019/0073907 A1 Mar. 7, 2019

(30) Foreign Application Priority Data

Sep. 6, 2017 (JP) .................................. 2017-170880

(51) Int. Cl.
| | | |
|---|---|---|
| *B60W 10/18* | (2012.01) | |
| *B60W 10/20* | (2006.01) | |
| *B60W 30/09* | (2012.01) | |
| *B60W 30/14* | (2006.01) | |
| *G08G 1/16* | (2006.01) | |
| *G08G 1/01* | (2006.01) | |
| *B60W 50/14* | (2020.01) | |

(52) U.S. Cl.
CPC ............. *G08G 1/166* (2013.01); *B60W 10/18* (2013.01); *B60W 10/20* (2013.01); *B60W 30/09* (2013.01); *B60W 30/14* (2013.01); *B60W 50/14* (2013.01); *G08G 1/0112* (2013.01); *B60W 2050/143* (2013.01); *B60W 2420/403* (2013.01); *B60W 2554/00* (2020.02)

(58) Field of Classification Search
CPC ...... B60W 10/18; B60W 10/20; B60W 30/09; B60W 30/14; B60W 2554/00; B60W 2554/4026; B60W 2554/4029; G08G 1/166

See application file for complete search history.

(56) References Cited

U.S. PATENT DOCUMENTS

| | | | |
|---|---|---|---|
| 2009/0185717 A1* | 7/2009 | Watanabe | G06K 9/6203 382/103 |
| 2017/0120804 A1* | 5/2017 | Kentley | B60W 30/08 |
| 2018/0022328 A1* | 1/2018 | Tochigi | G08G 1/167 701/70 |
| 2018/0222474 A1* | 8/2018 | Hiraiwa | B60W 50/14 |
| 2019/0071074 A1* | 3/2019 | Gokan | G05D 1/0257 |

FOREIGN PATENT DOCUMENTS

| | | |
|---|---|---|
| JP | 2011-191227 A | 9/2011 |
| JP | 2012-145441 A | 8/2012 |
| JP | 2016-206970 A | 12/2016 |

* cited by examiner

*Primary Examiner* — Anshul Sood
(74) *Attorney, Agent, or Firm* — Maschoff Brennan

(57) ABSTRACT

In a cruise assist control apparatus, a controller controls a cruise assist unit in a pedestrian assist mode upon it being determined that a target object is detected around a vehicle and recognized as a pedestrian. The controller determines whether a similar object that is similar to a pedestrian is located close to the target object upon it being determined that the target object is detected around the vehicle and recognized as a pedestrian. The controller maintains the pedestrian assist mode for a predetermined maintenance period even upon it being determined that the recognized pedestrian is not detected by a determiner. The controller alters at least one parameter of the pedestrian assist mode based on whether a similar object is located close to the target object.

13 Claims, 8 Drawing Sheets

FIG.5

| SETTING | WARNING TASK | | BRAKING ASSIST TASK | | BRAKING ASSIST TASK | |
|---|---|---|---|---|---|---|
| | SETTING 1 | SETTING 2 | SETTING 1 | SETTING 2 | SETTING 1 | SETTING 2 |
| EXECUTION TIMING (TTC) | RTb1 | RTb2 | RTc1 | RTc2 | RTd1 | RTd2 |
| ASSIST QUANTITY (WARNING LEVEL, BRAKING FORCE, STEERING ANGLE) | WL1 | WL2 | BF1 | BF2 | θ1 | θ2 |

CRUISE ASSIST METHOD AND APPARATUS FOR VEHICLE

CROSS REFERENCE TO RELATED APPLICATIONS

This application is based on and claims the benefit of priority from Japanese Patent Application 2017-170880 filed on Sep. 6, 2017, the disclosure of which is incorporated in its entirety herein by reference.

TECHNICAL FIELD

The present disclosure relates to cruise assist methods and apparatuses for vehicles.

BACKGROUND

Cruise assist technologies for vehicles, such as braking assist technologies and steering assist technologies, have been advancing.

These types of cruise assist technologies perform one or more cruise assist tasks based on detected target objects.

An example of this type of cruise assist technologies is configured to perform one or more cruise assist tasks, such as a task of assisting the braking of a vehicle, based on a positional relationship between the vehicle and a detected target object recognized as a person, such as a pedestrian.

Japanese Patent Application Publication No. 2016-206970, which is an example of this type of cruise assist technologies, discloses a technology that (1) Continuously detects, from an own vehicle, a target object using captured images (2) Recognize the detected target object as a pedestrian (3) Addresses disappearance of the target object, which has been continuously recognized as a pedestrian, in a captured image due to, for example, rapid changes in image capturing environment around the own vehicle, such as change from no back-light environment to back-light environment Specifically, the disclosed technology is configured to, even if the detected target object recognized as a pedestrian has disappeared from a captured image, continuously maintain the object detected state for a predetermined period since the disappearance of the target object.

SUMMARY

Nontarget objects, such as two-wheel vehicles, on which riders are riding, which are different from but similar to pedestrians, may be erroneously recognized as pedestrians. In this case, the disclosed technology may be configured to, even if a nontarget object erroneously recognized as a pedestrian has disappeared from a captured image, continuously maintain the non-target object detected state for the predetermined period after the disappearance of the nontarget object. This configuration however may result in unnecessary execution of the one or more cruise assist tasks for the nontarget object during the period for which the non-target object detected state is continuously maintained.

Unnecessary execution of the one or more cruise assist tasks may cause a driver of the vehicle to feel discomfort and/or hamper traffic on the road on which the vehicle is travelling.

Note that an increase in the recognition accuracy of pedestrians from nontarget objects similar to these pedestrians may result in a delay in distinguishing the pedestrians from the nontarget objects.

Users have therefore a desire to reduce or prevent unnecessary execution of the one or more cruise assist tasks during the period for which the object detected state is continuously maintained.

The present disclosure aims to satisfy the desire set forth above, and can be designed as, for example, first and second exemplary aspects described hereinafter.

According to the first exemplary aspect of the present disclosure, there is provided a cruise assist apparatus for a vehicle. The cruise assist apparatus includes a determiner configured to determine whether a target object is detected around the vehicle and recognized as a pedestrian. The cruise assist controller includes a cruise assist unit configured to perform at least one task of assisting a cruise of the vehicle, and a cruise assist controller. The cruise assist controller is configured to (1) Control the cruise assist unit in a pedestrian assist mode upon it being determined that the target object is detected around the vehicle and recognized as a pedestrian, the pedestrian assist mode having an assist level set to be suitable for the target object being recognized as a pedestrian (2) Determine whether a similar object that is similar to a pedestrian is located close to the target object upon it being determined that the target object is detected around the vehicle and recognized as a pedestrian (3) Maintain the pedestrian assist mode for a predetermined maintenance period even upon it being determined that the recognized pedestrian is not detected by the determiner (4) Alter at least one parameter of the pedestrian assist mode based on whether the similar object is located close to the target object According to the second exemplary aspect of the present disclosure, there is provided a cruise assist method for a vehicle. The cruise assist method includes (1) Determining whether a target object is detected around the vehicle and recognized as a pedestrian (2) Causing a cruise assist unit to perform at least one task of assisting a cruise of the vehicle (3) Controlling the cruise assist unit in a pedestrian assist mode upon it being determined that the target object is detected around the vehicle and recognized as a pedestrian, the pedestrian assist mode having an assist level set to be suitable for the target object being recognized as a pedestrian (4) Determining whether a similar object that is similar to a pedestrian is located close to the target object upon it being determined that the target object is detected around the vehicle and recognized as a pedestrian (5) Maintaining the pedestrian assist mode for a predetermined maintenance period even upon the recognized pedestrian being not detected (6) Altering at least one parameter of the pedestrian assist mode based on whether the similar object is located close to the target object Each of the first and second exemplary aspects is configured to alter the at least one parameter of the pedestrian assist mode based on whether the similar object is located close to the target object. This makes it possible to, for example, reduce a value of the at least one parameter of the pedestrian assist mode when the similar object is located close to the target object. This makes it possible to reduce or prevent unnecessary execution of the assist task if the similar object is located close to the target object so that there is a high possibility of the similar object being erroneously recognized as a pedestrian.

BRIEF DESCRIPTION OF THE DRAWINGS

Other aspects of the present disclosure will become apparent from the following description of embodiments with reference to the accompanying drawings in which:

FIG. 5 is a table schematically illustrating, for every cruise assist task, execution timings and assist quantities for respective pedestrian assist mode and non-pedestrian assist mode;

DETAILED DESCRIPTION OF EMBODIMENT

Figure 1:
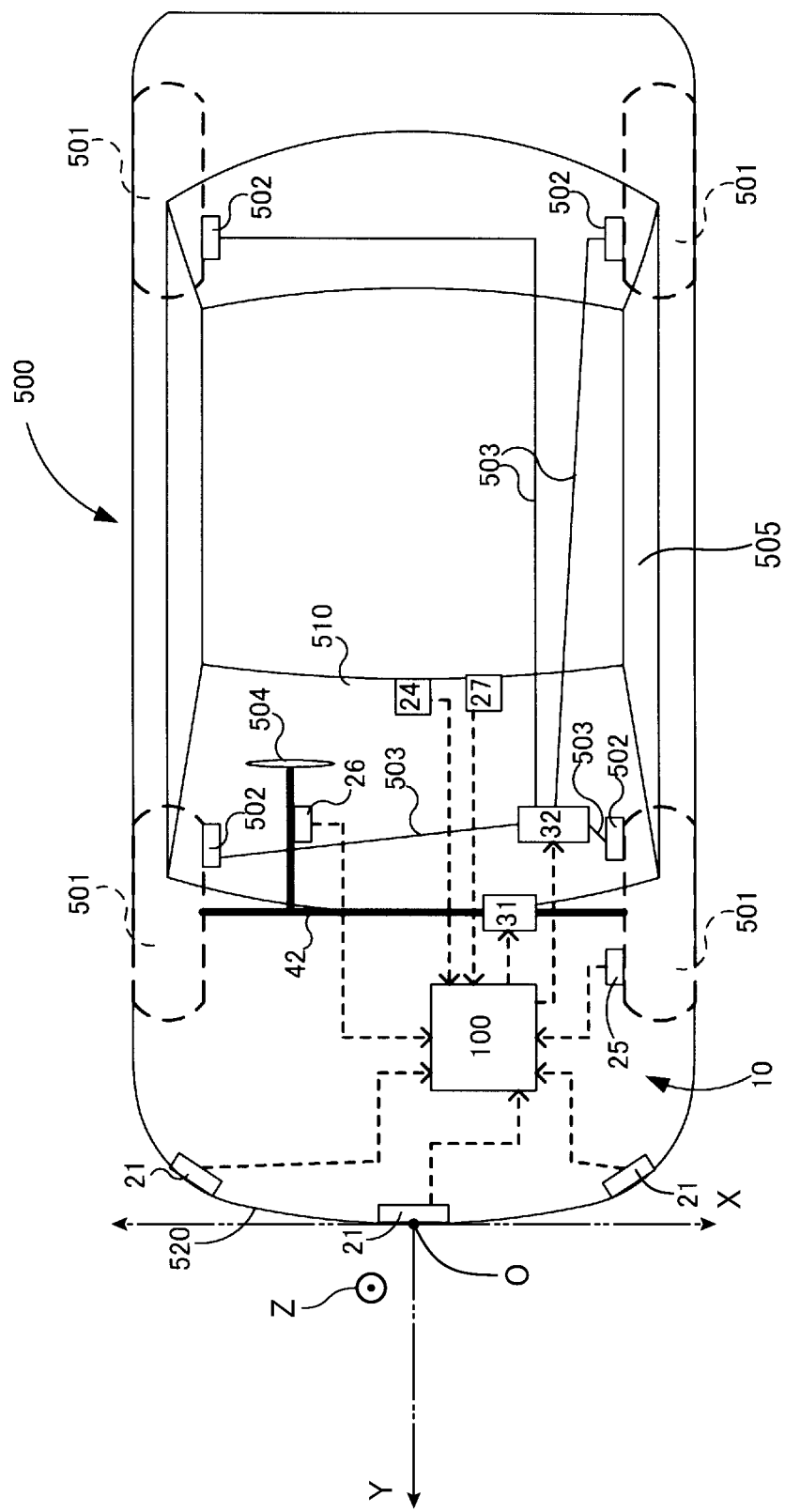
FIG. 1 is a block diagram schematically illustrating a cruise assist system installed in a vehicle according to the first embodiment of the present disclosure.

The following describes cruise assist methods and apparatuses for a vehicle according to preferred embodiments of the present disclosure with reference to the accompanying drawings. Like parts between the embodiments, to which like reference characters are assigned, are omitted or simplified to avoid redundant description.

First Embodiment

The following describes the first embodiment of the present disclosure with reference to FIGS. 1 to 6.

Referring to FIG. 1, a cruise assist system 10 according to the first embodiment is installed in a vehicle 500; the vehicle 500 is not limited to a four-wheel vehicle, and a two-wheel vehicle or a three-wheel vehicle can be used as the vehicle 500.

The cruise assist system 10 includes a control apparatus 100, at least one millimeter-wave radar 21, and a camera 24 for capturing a front view field relative to the vehicle 500 in the travelling direction of the vehicle 500. The cruise assist system 10 also includes wheel speed sensors 25, a rotational angle sensor 26, an illuminance sensor 27, and an informing device 50.

The vehicle 500 includes a vehicle body 505, a steering assist unit 31, a braking assist unit 32, a steering mechanism 42, front and rear wheels 501, braking devices 502, braking lines 503, a steering wheel 504, a vehicle body 505, a front windshield 510, and a front bumper 520; these components 31, 32, 42, 501, 502, 503, 504, 505, and 510 are mounted or installed to the vehicle body 505. The front windshield 510 is mounted to a predetermined portion of the vehicle body 505 in front of front occupants. The front bumper 520 is attached to, for example, the front end of the vehicle body 505.

Note that the vehicle 500 can be comprised of at least the camera 24 for capturing the front view field relative to the vehicle 500. The vehicle 500 can also include a monocular camera or a stereo camera as the camera 24.

As descried above, the vehicle 500 according to the first embodiment includes the at least one millimeter-wave radar 21 in addition to the camera 24.

The at least one millimeter-wave radar 21 is configured to transmit millimeter waves to a predetermined region located in a predetermined direction relative thereto, and receive reflected electromagnetic waves, such as echoes, generated based on reflection of the transmitted radar waves from target objects located in the predetermined region. That is, the at least one millimeter-wave radar 21 aims to detect, based on the received reflected waves, the position of each target object, the horizontal and/or vertical azimuths of each target object relative to the vehicle 500, and the distance of each target object relative to the vehicle 500.

For example, the cruise assist system 10 includes three millimeter-wave radars, i.e. first to third millimeter-wave radars, 21. The first millimeter-wave radar 21 is mounted to, for example, the center of the front surface of the front bumper 520, and the second and third millimeter-wave radars 21 are respectively mounted to, for example, lateral sides of the front bumper 520.

For example, each millimeter-wave radar 21 can include a signal processing circuit configured to perform predetermined signal processing based on the received echoes from a target object to thereby output a measurement signal indicative of information about the sequence of dots; each of the dots represents a typical position of the target object. That is, the measurement signal can include, as information about measurement points indicative of a target object, (1) Information about three-dimensional coordinates, i.e. (x, y, z) coordinates, of each measurement point (2) Information indicative of a relative speed of each measurement point relative to the vehicle 500

(3) Information indicative of the received intensity of a corresponding echo of each measurement point, and/or (4) Information indicative of received power of a corresponding echo of each measurement point Note that a three-dimensional coordinate system based on a predetermined origin O that is defined at, for example, the center of the front of the vehicle 500 has X, Y, and Z axes respectively defined to be substantially parallel with the vehicle width direction, i.e. the horizontal direction, the longitudinal direction, and the height direction, i.e. the vertical direction, of the vehicle 500 (see FIG. 1). The three-dimensional coordinates (x, y, z) represent a corresponding coordinate point in the three-dimensional coordinate system.

At that time, the control apparatus 100 can be configured to perform predetermined signal processing based on the measurement signal to thereby detect the position of the target object, the horizontal and/or vertical azimuths of the target object relative to the vehicle 500, and the distance of the target object relative to the vehicle 500.

Alternatively, each millimeter-wave radar 21 can be configured to output the received echoes as measurement signals to the control apparatus 100. At that time, the control apparatus 100 can be configured to perform predetermined signal processing based on the received measurement signals, i.e. echoes, from a target object to thereby detect the position of the target object, the horizontal and/or vertical azimuths of the target object relative to the vehicle 500, and the distance of the target object relative to the vehicle 500.

A laser radar, i.e. a lidar, or an ultrasonic sensor can be used in place of or in addition to each millimeter-wave radar 21.

The camera 24 is, for example, mounted to the center of the upper portion of the front windshield 510. The camera 24 is designed as an imager comprised of at least one charge-coupled device (CCD) image sensor or at least one complementary metal-oxide-semiconductor (CMOS) image sensor. The image sensor is comprised of light-sensitive elements; the light-sensitive elements serve as pixels and are arranged in a two-dimensional array. The two-dimensionally arranged pixels constitute a light receiving area, i.e. an imaging area, on which visible light incident to the camera 24 is received.

That is, the camera 24 successively captures an image, i.e. a frame image, of a predetermined front region ahead of the vehicle 500 based on visible light incident from the front region to the imaging area such that each of the light-sensitive elements (pixels) receives a corresponding component of the visible light.

The camera 24 successively outputs, as measurement signals, successively captured frame images to the control apparatus 100. Each of the frame images, which are also referred to as image data frames, is comprised of pixel values each corresponding to the component of the visible light received by a corresponding one of the pixels of the imaging area. That is, each of the measurement signals output from the camera 24 can include, as information about the corresponding frame image, information about three-dimensional coordinates, i.e. (x, y, z) coordinates, of each pixel of the corresponding frame image in the three-dimensional coordinate system (see FIG. 1), and a luminance value of each pixel of the corresponding frame image. Each of the frame images is a monochrome image or a color image.

The measurement signals output from the camera 24 include information, such as optical flow information, that enables the control apparatus 100 to obtain a relative speed of a target object included in the corresponding captured image relative to the vehicle 500.

Each of the braking devices 502 is provided for a corresponding one of the wheels 501. Each of the braking devices 502 is communicably connected to an unillustrated brake master cylinder including a brake piston via the braking line 503; the brake piston is mechanically linked to a brake pedal. When the brake pedal is depressed by a driver of the vehicle 500, the brake piston is activated in response to the depression of the brake pedal to produce hydraulic pressure. The hydraulic pressure is supplied to each of the braking devices 502 via the braking line 503, so that each of the braking devices 502 brakes the corresponding wheel 501 based on the hydraulic pressure supplied thereto through the braking line 503.

The braking assist unit 32 is located on a portion of the braking line 503. The braking assist unit 32 includes at least one actuator that produces hydraulic pressure. Specifically, the braking assist unit 32 is capable of controlling the hydraulic pressure to be supplied to each braking device 502 independently of the driver's operation of the brake pedal. That is, the braking assist unit 32 and the control apparatus 100 are capable of performing a task of assisting the braking of the vehicle 500 in accordance with the measurement signals, i.e. the frame images, captured by the camera 24 and/or the measurement signals sent from each of the millimeter-wave radars 21.

Note that the vehicle 500 includes an unillustrated antiskid brake system including at least one actuator and an unillustrated antilock brake system including at least one actuator. The at least one actuator of the unillustrated antiskid brake system is configured to control the hydraulic pressure to be supplied to a selected wheel to thereby prevent the selected wheel from slipping. The at least one actuator of the unillustrated antilock brake system is configured to control the hydraulic pressure to be supplied to at least one wheel 501 when sensing that the at least one wheel 501 is locking up during braking.

That is, the braking assist unit 32 and the control apparatus 100 are capable of performing the task of assisting the braking of the vehicle 500 using the at least one actuator installed in the antiskid brake system or antilock brake system in place of the at least one actuator installed in the braking assist unit 32.

The braking assist unit 32 is included in a vehicle assist unit that performs one or more cruise assist tasks including the task of assisting the braking of the vehicle 500. The task of assisting the braking will be referred to as a braking assist task hereinafter.

The steering wheel 504 is coupled to the front wheels 501 via the steering mechanism 42 that includes a steering rod and a steering mechanism that includes, for example, a rod-shaped rack, a pinion, and turning axles.

The steering rod has opposing first and second ends, and the steering wheel 504 is mounted to the first end of the steering rod. The pinion is mounted to the second end of the steering rod, and is engaged with the rack. The rack is located in the horizontal direction, i.e. the width direction, of the vehicle 500, and has both ends. Each of the turning axles has opposing first and second ends. The first end of each of the turning axles is coupled to a corresponding one of both ends of the rack. One of front wheels 501 is mounted to the second end of one of the turning axles, and the other of the front wheels 501 is also mounted to the second end of the other of the turning axles.

Driver's turning of the steering wheel 504 causes the steering rod coupled to the steering wheel 504 to turn. This rotary motion, i.e. torque, of the steering rod is transformed to linear motion of the rack. This linear motion of the rack causes the front wheels 501 to steer via the respective turning axles. The steering angle of each of the front wheels 501 is determined based on the axial displacement of the rack.

The steering mechanism 42 includes an actuator, such as an electric motor, coupled to, for example, the steering rod or the rack.

The steering assist unit 31 is installed in the steering mechanism 42, and is operative to control drive of the actuator independently of the driver's operation of the steering wheel 504. That is, the steering assist unit 31 and the control apparatus 100 are capable of performing a task of assisting the steering of the vehicle 500 in accordance with the measurement signals, i.e. the frame images, captured by the camera 24 and/or the measurement signals sent from each of the millimeter-wave radars 21. The braking assist unit 32 is included in the vehicle assist unit that performs one or more cruise assist tasks including the task of assisting the steering of the vehicle 500. The task of assisting the steering will be referred to as a steering assist task hereinafter.

Figure 2:
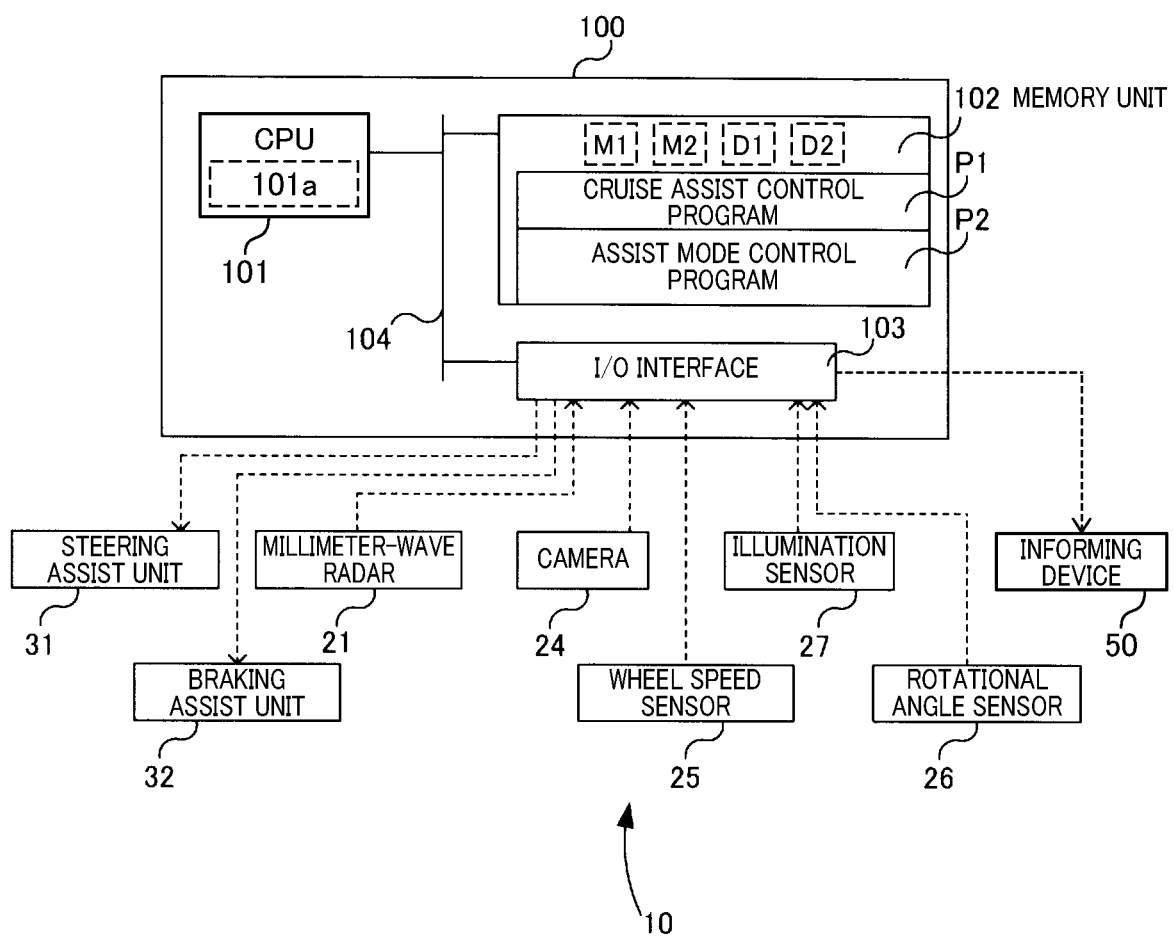
FIG. 2 is a structural block diagram schematically illustrating a hardware structure of the cruise assist system illustrated in FIG. 1.

Referring to FIG. 2, the control apparatus 100 is comprised of at least one microcomputer circuit including a CPU 101, a memory unit 102, an input-output (I/O) interface 103, and a bus 104. The components 101, 102, and 103 are mutually connected to each other via the bus 104 such that they are communicable with each other.

The memory unit 102 for example includes a first memory, such as a ROM, in which various programs including at least a cruise assist control program P1 and an assist mode control program P2 are stored. The memory unit 102 also includes, for example, a second memory, such as a RAM, from which the CPU 101 can read data and into which the CPU 101 can write data.

The cruise assist control program P1 is provided for the cruise assist tasks. The cruise assist control program P1 is designed to instruct the CPU 101 to (1) Select one of a pedestrian assist mode, i.e. a pedestrian safety mode, a non-pedestrian assist mode, i.e. a non-pedestrian safety mode, and a pedestrian-assist mode maintenance mode for the cruise assist tasks in accordance with the measurement signal, i.e. the frame images, captured by the camera 24 and/or the measurement signals sent from each of the millimeter-wave radars 21

(2) Perform the cruise assist tasks based on the determined one of the pedestrian assist mode, non-pedestrian assist mode, and pedestrian-assist mode maintenance mode The assist mode control program P2 is designed to instruct the CPU 101 to select, as the assist mode of the control apparatus 100, one of the pedestrian assist mode, the non-pedestrian assist mode, and the pedestrian assist-mode maintenance mode to be carried out by the CPU 101.

The CPU 101 loads the cruise assist control program P1 and the assist mode control program P2 to the second memory, and executes the cruise assist control program P1 and the assist mode control program P2 to thereby serve as a cruise assist controller 101a.

Each of the millimeter-wave radars 21, the camera 24, the wheel speed sensors 25, the rotational angle sensor 26, the illuminance sensor 27, the steering assist unit 31, the braking assist unit 32, and the informing device 50 are communicably connected to the I/O interface 103 via respective control lines. As described later, measurement signals respectively sent from the millimeter-wave radars 21, the camera 24, the wheel speed sensors 25, the rotational angle sensor 26, and the illuminance sensor 27 are input to the I/O interface 103. Instruction signals sent from the CPU 101 are output from the I/O interface 103 to the respective steering assist unit 31 and braking assist unit 32.

Each of the wheel speed sensors 25 is mounted to the corresponding one of the wheels 501 of the vehicle 500. Each of the wheel speed sensors 25 is configured to output, to the control apparatus 100, a measurement signal indicative of the rotational speed of the corresponding one of the wheels 501. For example, each of the wheel speed sensors 25 outputs, as the measurement signal, a pulse signal comprised of pulses having intervals therebetween. Each of the pulses has a voltage level that represents a corresponding wheel speed at a corresponding timing, or each interval of the pulses represents a corresponding wheel speed at a corresponding timing. Upon receiving the measurement signal from each wheel speed sensor 25, the control apparatus 100 can calculate the travelling speed of the vehicle 500 and a travelled distance of the vehicle 500.

The rotational angle sensor 26 is for example provided to be capable of measuring a twist quantity, i.e. a twist angle, of the steering rod caused by turning of the steering wheel 504, and converting the twist quantity, as steering torque or a steering angle. Then, the torque sensor 73 outputs a measurement signal indicative of at least one of the steering torque and the steering angle to the control apparatus 100. The measurement signal output from the torque sensor 73 has a voltage level proportional to the twist quantity.

The illuminance sensor 27 is mounted to the front windshield 501 or a dashboard of the vehicle 500, and is operative to measure ambient illuminance or luminous intensity around the vehicle 500, and output, to the controller apparatus 100, a measurement signal indicative of the ambient illuminance or the luminous intensity around the vehicle 500. For example, the illuminance sensor 27 includes a photo diode, and is configured to convert ambient illuminance or luminous intensity received by the photodiode into a voltage signal proportional to the ambient illuminance or luminous intensity. Then, the illuminance sensor 27 is configured to output, as the measurement signal, the voltage signal proportional to the ambient illuminance or luminous intensity.

The informing device 50 includes, for example, at least one of a visible output device, such as a display on the dashboard panel, and an audible output device, such as a speaker. The informing device 50 is configured to provide, to a driver of the vehicle 500, visible and/or audible information.

Figure 3:
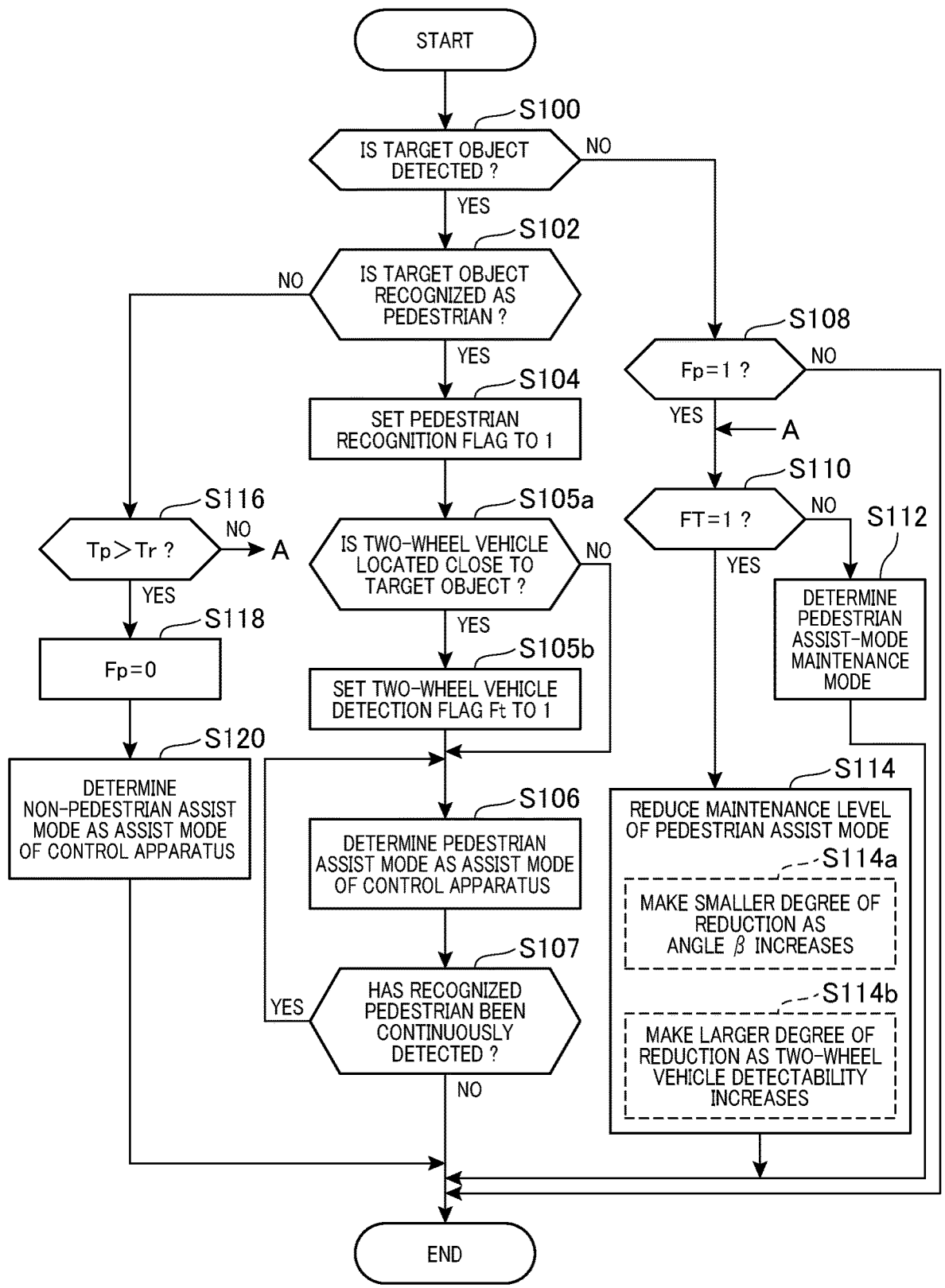
FIG. 3 is a flowchart schematically illustrating an example of a cruise assist routine executed by a control apparatus illustrated in FIG. 1.

The following describes a cruise assist routine carried out by the CPU 101 of the control apparatus 100 with reference to FIG. 3. The CPU 101 can be programmed to execute the programs P1 and P2 to thereby execute the cruise assist routine every predetermined period after the overall control system installed in the vehicle 500 is started.

Note that the CPU 101 is configured to perform a recognition operation based on pattern matching processing for detected target objects, which is described later, using the measurement signal currently sent from the camera 24, i.e. the frame image currently captured by the camera 24 according to the first embodiment. Additionally, the CPU 101 is configured to perform a determination operation for determining whether a two-wheel vehicle, i.e. a motor cycle, is travelling close to the vehicle 500, which is described later, using the measurement signal currently sent from the camera 24, i.e. the frame image currently captured by the camera 24 according to the first embodiment. Hereinafter, one cruise assist routine periodically performed by the CPU 101 will be referred to as a cycle.

Upon starting a current cycle of the cruise assist routine, the CPU 101 determines, based on at least one of the measurement signals currently sent from the respective millimeter-wave radars 21 and the camera 24, whether at least one target object is detected based on at least one of the measurement signals in step S100.

Specifically, the CPU 101 determines, based on the measurement signals currently sent from the respective millimeter-wave radars 21 and the camera 24, whether at least one target object is located within a predetermined detection region defined to extend from the vehicle 500 in its travelling direction in step S100. The predetermined detection region has, for example, a predetermined maximum width in the width direction of the vehicle 500, and a predetermined maximum length relative to the own vehicle 500 in its longitudinal direction.

For example, a total detectable region defined by the millimeter-wave radars 21 can be used as the detection region. Alternatively, a region may be used whose shape is substantially identical to the shape of the total detectable region of the millimeter-wave radars 21 except that the maximum length of the region relative to the vehicle 500 in its longitudinal direction is shorter than the maximum length of the total detectable region in the longitudinal direction of the vehicle 500.

The target objects can include obstacles with which the vehicle 500 has a possibility of colliding, such as other vehicles, pedestrians, curbs, guardrails, road signs, and signboards.

Upon determining that at least one target object is detected based on at least one of the measurement signals (YES in step S100), the CPU 101 performs the recognition operation to thereby determine whether at least one target object is recognized as a pedestrian in step S102.

Specifically, the memory unit 102 stores an object pattern dictionary D1. The object pattern dictionary D1 includes feature pattern images provided for each of various types of the target objects. That is, the object pattern dictionary D1 includes feature pattern images for the various types of pedestrians.

For example, the CPU 101 obtains an image region indicative of the at least one target object in the captured frame image included in the measurement signal sent from the camera 24, and reads, from the memory unit 102, the feature pattern images for the various types of pedestrians in step S102. Then, the CPU 101 executes pattern matching processing between the feature pattern images and the imaging region, thus calculating a level of the similarity of the image region with respect to the feature pattern images in step S102. Thereafter, the CPU 101 determines whether the level of the similarity is equal to or higher than a predetermined reference similarity level in step S102.

Upon determining that the level of the similarity is equal to or higher than the predetermined reference similarity level, the CPU 101 recognizes the at least one target object as a pedestrian (YES in step S102). Then, the CPU 101 sets a pedestrian recognition flag Fp to ON, i.e. 1, or holds the pedestrian recognition flag Fp being 1 in step S104

The pedestrian recognition flag Fp is, for example, a bit having two different logical values represented by 0 and 1. That is, the pedestrian recognition flag Fp, when is set to 1, represents that the at least one target object is recognized as a pedestrian. In contrast, the pedestrian recognition flag Fp, when is set to 0, represents that no target objects are recognized as pedestrians.

Figure 4:
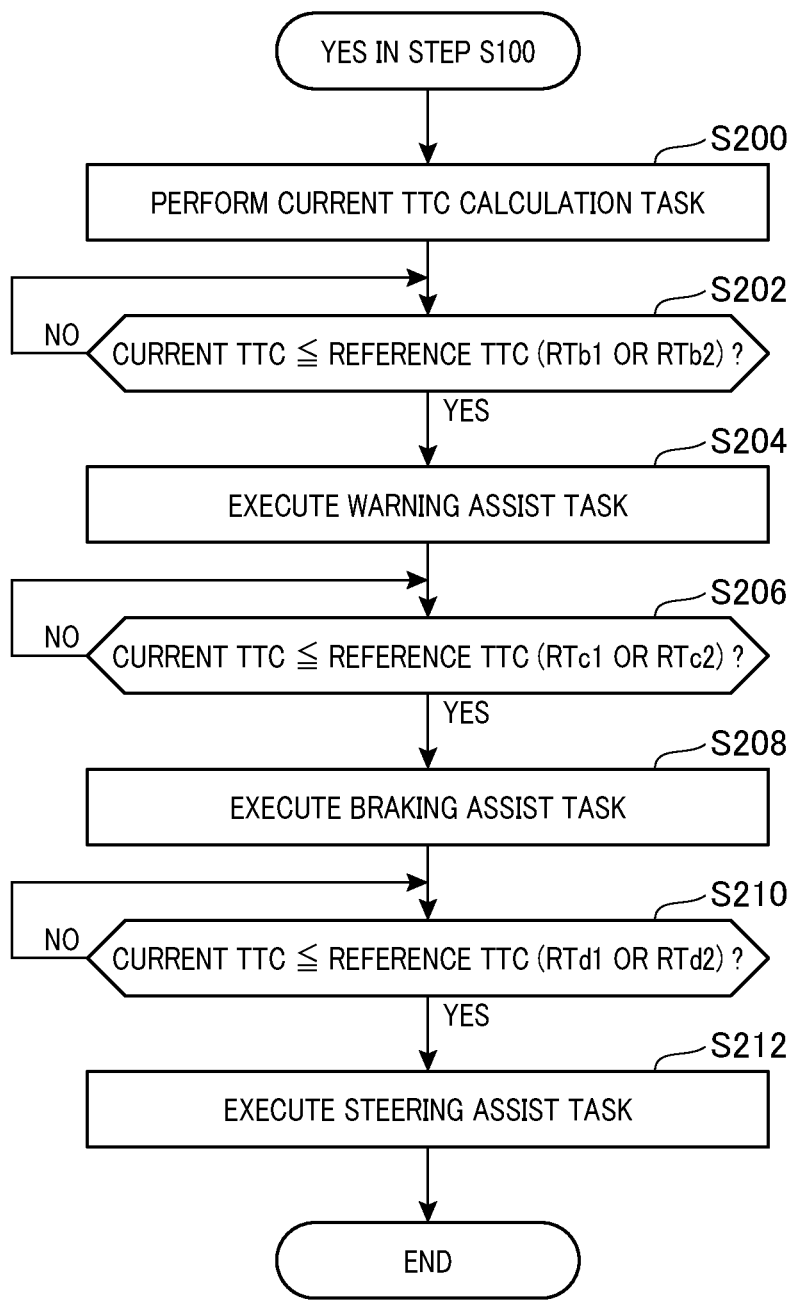
FIG. 4 is a flowchart schematically illustrating an example of a cruise assist subroutine executed by the control apparatus.

In addition, in response to the affirmative determination in step S100, the CPU 101 executes a cruise assist subroutine (see FIG. 4).

Specifically, the CPU 101 performs a current TIC calculation task in step S200. The current TTC calculation task is designed to calculate, based on the measurement signals sent from the millimeter-wave radars 21 and the camera 24, a time to collision (TTC), which represents a margin time until which the own vehicle 500 would collide with the at least one target object detected in step S100.

For example, the CPU 101 executes the current ITC calculation task to thereby calculate a current value of the TTC, which also be referred to as a current TTC hereinafter, for the at least one target object in accordance with the three-dimensional coordinates (x, y, z) of the at least one target object and the relative speed between the vehicle 500 and the at least one target object.

Following the operation in step S104, the CPU 101 determines whether at least one two-wheel vehicle, such as a motor cycle or a bicycle, is located close to the at least one target object, i.e. the recognized pedestrian, in step S105a. Two-wheel vehicles are an example of similar objects similar to pedestrians.

Specifically, the object pattern dictionary D1 includes feature pattern images for the various types of two-wheel vehicles or their similar objects, such as vertically long objects, including road signs and signboards.

For example, in step S105a, the CPU 101 reads, from the memory unit 102, the feature pattern images for the various types of two-wheel vehicles and their similar objects. Then, the CPU 101 executes pattern matching processing between the feature pattern images and the current captured image currently acquired in the current cycle of step S102 or a past captured image acquired in a past cycle of step S102 to thereby determine, based on the result of the pattern matching processing, whether at least one two-wheel vehicle is located close to the at least one target object, i.e. the recognized pedestrian in step S105a.

Upon determining that at least one two-wheel vehicle is located close to the at least one target object, i.e. the recognized pedestrian (YES in step S105a), the CPU 101 sets a two-wheel vehicle detection flag Ft to ON, i.e. 1, or holds the two-wheel vehicle detection flag Ft being 1 in step S105b.

The two-wheel vehicle detection flag Ft is, for example, a bit having one of two different logical values represented by 0 and 1. That is, the two-wheel vehicle detection flag Ft, if set to 1, represents that the two-wheel vehicle located close to the at least one target object, i.e. the recognized pedestrian, has been detected. In contrast, the two-wheel vehicle detection flag Ft, if set to 0, represents that no two-wheel vehicles located close to the at least one target object recognized as a pedestrian have been detected.

Figure 6:
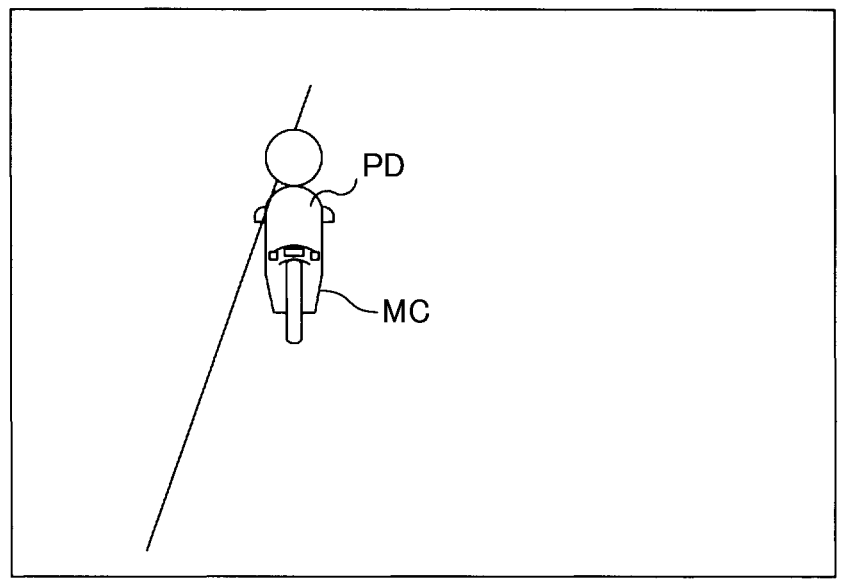
FIG. 6 is a view schematically illustrating a two-wheel vehicle on which a rider is riding in a captured image according to the first embodiment.

Let us consider a situation where a target object is recognized as a pedestrian (see YES in step S102), and a two-wheel vehicle, which is located close to the at least one target object, which is the recognized pedestrian, is detected (YES in step S105a). FIG. 6 illustrates this situation. Specifically, as illustrated in FIG. 6, this situation shows that (1) A two-wheel vehicle MC on which a rider PD is riding is detected in step S100

(2) The two-wheel vehicle MC on which the rider is riding is erroneously recognized as a pedestrian in step S102

(3) The two-wheel vehicle MC, which is located close to the rider PD, is detected (see YES in step S105a).

That is, the affirmative determination in step S102 and the affirmative determination in step S105a show a high possibility that a two-wheel vehicle on which a rider is riding is erroneously recognized as a pedestrian.

On the other hand, let us consider another situation where (1) A detected target object is recognized as a pedestrian (see YES in step S102)

(2) No two-wheel vehicles, which are located close to the at least one target object recognized as a pedestrian, are detected (NO in step S105a)

Figure 7:
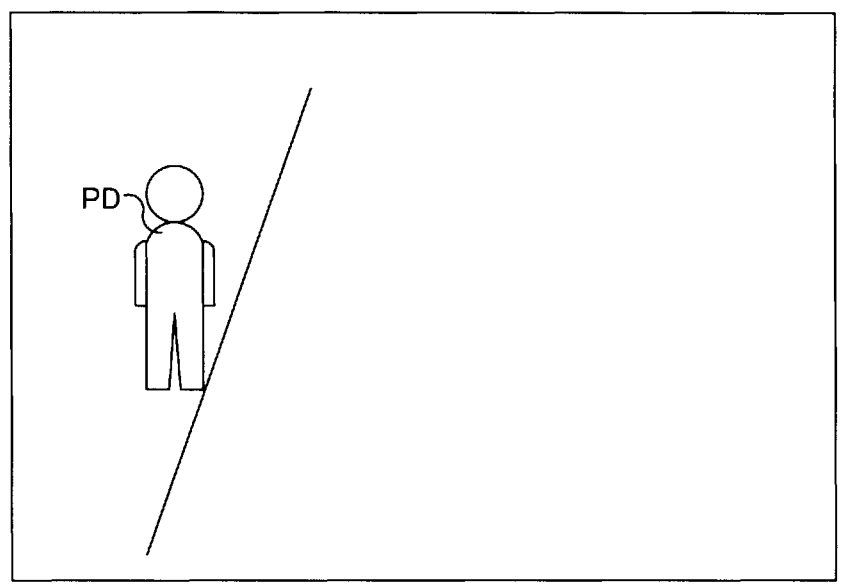
FIG. 7 is a view schematically illustrating that no two-wheel vehicles in a captured image according to the first embodiment.

FIG. 7 illustrates this situation. Specifically, as illustrated in FIG. 7, this situation shows that an actual pedestrian PD is detected and recognized as a pedestrian in step S102, and no two-wheel vehicles, which are located close to the at least one target object, i.e. the recognized pedestrian, are detected (see NO in step S105a).

That is, the affirmative determination in step S102 and the negative determination in step S105a probably result in an actual pedestrian being recognized.

Following the operation in step S105b, the CPU 101 sets a pedestrian recognition flag Fp to ON, i.e. 1, or holds the pedestrian recognition flag Fp being 1 in step S104, and determines the pedestrian assist mode for each of the cruise target tasks as the assist mode of the control apparatus 100 in step S106.

Note that, as described above, the pedestrian assist mode and the non-pedestrian assist mode are provided for each of the cruise assist tasks.

The pedestrian recognition flag Fp is, for example, a bit having two different logical values represented by 0 and 1. That is, the pedestrian recognition flag Fp, when is set to 1, represents that at least one detected target object is recognized as a pedestrian, so that the pedestrian assist mode is selected for each of the cruise assist tasks. In contrast, the pedestrian detection flag Fp, when is set to 0, represents that the at least one detected target is not recognized as a pedestrian, so that the non-pedestrian assist mode is selected for each of the cruise assist tasks. For example, the initial value of the pedestrian recognition flag Fp is set to 0.

That is, at least one assist level for each of the cruise assist tasks based on the pedestrian assist mode is more enhanced than the corresponding at least one assist level for the corresponding one of the cruise assist tasks based on the non-pedestrian pedestrian assist mode.

The cruise assist tasks include, for example, the steering assist task, the braking assist task, a collision probability determination task, and a warning assist task, which are carried out by the CPU 101.

The collision probability determination task includes (1) A first group of reference TTCs RTb1, RTc1, and RTd1 for the respective warning assist task, the braking assist task, and the steering assist task in the pedestrian assist mode (2) A second group of reference TTCs RTb2, RTc2, and RTd2 for the respective warning assist task, the braking assist task, and the steering assist task in the non-pedestrian assist mode For example, the reference TTC RTb1 for the warning assist task is set to be longer than the reference TTC RTc1 for the braking assist task, and the reference TTC RTc1 for the braking assist task is set to be longer than the reference TTC RTd1 for the steering assist task.

Similarly, the reference TTC RTb2 for the warning assist task is set to be longer than the reference TTC RTc2 for the braking assist task, and the reference TIC RTc2 for the braking assist task is set to be longer than the reference TIC RTd2 for the steering assist task.

That is, the CPU 101 executes the collision probability determination task to determine whether the current value of the TIC is equal to or smaller than each of the reference TTCs RTb1, RTc1, and RTd1 if the pedestrian assist mode is selected.

In addition, the CPU 101 executes the collision probability determination task to determine whether the current value of the TIC is equal to or smaller than each of the reference TTCs RTb2, RTc2, and RTd2 if the non-pedestrian assist mode is selected in the same manner as the case of the pedestrian assist mode.

The collision probability determination task will be described in detail later.

As described above, at least one assist level for each of the cruise assist tasks based on the pedestrian assist mode is more enhanced than the corresponding at least one assist level for the corresponding one of the cruise assist tasks based on the non-pedestrian assist mode.

That is, the execution timing of each of the warning assist task, the braking assist task, and the steering assist task in the pedestrian assist mode is set to be earlier than the execution timing of the corresponding one of the warning assist task, the braking assist task, and the steering assist task in the non-pedestrian assist mode.

More specifically, the reference TTCs RTb1, RTc1, and RTd1 upon the pedestrian assist mode being selected are respectively set to be shorter than the reference TTCs RTb2, RTc2, and RTd2 upon the non-pedestrian assist mode being selected.

This enables the execution timing of each of the warning assist task, the steering assist task, and the braking assist task in the pedestrian assist mode to be earlier than the execution timing of the corresponding one of the waring task, the steering assist task, and the braking assist task in the non-pedestrian assist mode.

In addition, the assist quantity, such as the braking force, of the braking assist task based on the pedestrian assist mode is set to be greater than the assist quantity, such as the braking force, of the braking assist task based on the non-pedestrian assist mode. Similarly, the assist quantity, such as the steering angle, of the steering assist task based on the pedestrian assist mode is set to be greater than the assist quantity, such as the steering angle, of the steering assist task based on the non-pedestrian assist mode. In addition, the assist quantity, such as the luminance level of the displayed warning information or the level of the audibly output warning information, of the warning assist task based on the pedestrian assist mode is set to be greater than the assist quantity of the warning assist task based on the non-pedestrian assist mode.

Hereinafter, a value of the braking force based on the pedestrian assist mode will also be referred to as an assist quantity BF1, and a value of the braking force based on the non-pedestrian assist mode will also be referred to as an assist quantity BF2. In addition, a value of the steering angle based on the pedestrian assist mode will also be referred to as an assist quantity θ1, and a value of the steering angle based on the non-pedestrian assist mode will also be referred to as an assist quantity θ2. A value of the luminance level of the displayed warning or the level of the audibly output warning of the warning assist task based on the pedestrian assist mode will also be referred to as an assist quantity WL1, and a value of the luminance level of the displayed warning or the level of the audibly output warning of the warning assist task based on the non-pedestrian assist mode will also be referred to as an assist quantity WL2.

Specifically, in step S106, the CPU 101 sets (1) The execution timings of the warning assist task, braking assist task, and steering assist task to the respective reference TTCs RTb1, RTc1, and RTd1 in the pedestrian assist mode (2) The assist quantities of the warning assist task, braking assist task, and steering assist task to the respective values WL1, BF1, and θ1 in the pedestrian assist mode (see FIG. 5)

Note that, in FIG. 5, the pedestrian assist mode is abbreviated as MODE 1, and the non-pedestrian assist mode is abbreviated as MODE 2.

For example, the CPU 101 can be configured to increase the operating quantity of the at least one actuator of the braking assist unit 32 based on the pedestrian assist mode to be greater than the operating quantity of the at least one actuator of the braking assist unit 32 based on the non-pedestrian assist mode. This makes it possible to increase the braking force of the braking assist task based on the pedestrian assist mode to be greater than the braking force of the braking assist task based on the non-pedestrian assist mode.

Similarly, the CPU 101 can be configured to increase the operating quantity of the at least one actuator of the steering assist unit 31 based on the pedestrian assist mode to be greater than the operating quantity of the at least one actuator of the steering assist unit 31 based on the non-pedestrian assist mode. This makes it possible to increase the steering angle of the steering assist task based on the pedestrian assist mode to be greater than the steering angle of the steering assist task based on the non-pedestrian assist mode.

As described above, the assist levels of each of the cruise assist tasks include the execution timing, such as the reference TIC, of the corresponding cruise assist task, and the assist quantity of the corresponding cruise assist task.

The memory unit 102 for example stores maps M1 provided for the respective cruise assist tasks, i.e. the warning assist task, braking assist task, and steering assist task in the pedestrian assist mode. Travelling parameters are defined to show the driving conditions and travelling environment conditions of the vehicle 500. The driving conditions include, for example, the travelling speed of the vehicle 500 and a relative distance between the vehicle 500 and a target object. The travelling environment conditions include, for example, information indicative of whether the road on which the vehicle 500 is travelling has a substantially linear shape or a curved shape and information indicative of the weather condition around the vehicle 500.

Similarly, the memory unit 102 for example stores maps M2 provided for the respective cruise assist tasks, i.e. the warning assist task, braking assist task, and steering assist task in the non-pedestrian assist mode.

Each map M1 for the corresponding cruise assist task represents a relationship between (1) Values of each of the execution timing and the assist quantity for the corresponding cruise assist task in the pedestrian assist mode (2) Values of each travelling parameter Each map M2 for the corresponding cruise assist task represents a relationship between (1) Values of each of the execution timing and the assist quantity for the corresponding task in the non-pedestrian assist mode (2) Values of each travelling parameter That is, if the pedestrian assist mode is selected, the CPU 101 can obtain a value of each travelling parameter based on the measurement signals sent from the measurement devices 21, 24, 25, 26, and 27, and can select a value of the execution timing and a value of the assist quantity for each of the cruise assist tasks; the selected values of the execution timing and assist quantity match the obtained value of each travelling parameter in the map M1

Similarly, if the non-pedestrian assist mode is selected, the CPU 101 can obtain a value of each travelling parameter based on the measurement signals sent from the measurement devices 21, 24, 25, 26, and 27, and can select a value of the execution timing and a value of the assist quantity for each of the cruise assist tasks; the selected values of the execution timing and assist quantity match the obtained value of each travelling parameter in the map M2

As another example, the CPU 101 can be configured to dynamically calculate a value of the execution timing and a value of the assist quantity for each of the cruise assist tasks in the pedestrian assist mode in accordance with (1) A value of each travelling parameter obtained based on the measurement signals sent from the measurement devices 21, 24, 25, 26 and 27

(2) One or more previously prepared equations

Similarly, the CPU 101 can be configured to dynamically calculate a value of the execution timing and a value of the assist quantity for each of the cruise assist tasks in the non-pedestrian assist mode in accordance with (1) A value of each travelling parameter obtained based on the measurement signals sent from the measurement devices 21, 24, 25, 26, and 27

(2) One or more previously prepared equations

When the operation in step S106 is completed, the CPU 101 determines whether the recognized pedestrian has been continuously detected in step S107 in the same approaches as the operations in steps S100 and S102.

Upon determining that the recognized pedestrian has been continuously detected (YES in step S107), the CPU 101 holds the pedestrian assist mode in step S106. Otherwise, upon determining that the recognized pedestrian has been continuously detected (NO in step S107), the CPU 101 terminates the current cycle of the cruise assist routine, and performs the next cycle of the cruise assist routine after lapse of the predetermined period.

At that time, following the operation in step S200, the CPU 101 determines whether the current TTC is equal to or smaller than the reference TIC RTb1 in step S202.

When determining that the current TIC is not equal to or smaller than the reference TIC RTb1 (NO in step S202), the CPU 101 repeats the determination in step S202.

Otherwise, when determining that the current TIC is equal to or smaller than the reference TIC RTb1 (YES in step S202), the CPU 101 executes the warning assist task to send an instruction signal to the informing device 50 in step S204. The instruction signal instructs the informing device 50 to output visible and/or audible warning information for giving warning of the at least one target device against the driver of the vehicle 500.

For example, the informing device 50 can display the visible warning information as a projection on or via the front windshield 510 as a head-up display, and/or display the visible warning information on the display on the dashboard panel.

The displayed warning information or the audibly output warning information urges the driver of the vehicle 500 to brake the vehicle 500 and/or the steering of the vehicle 500.

Thereafter, the CPU 101 determines whether the current TIC is equal to or smaller than the reference TTC RTc1 in step S206.

When determining that the current TTC is not equal to or smaller than the reference TIC RTc1 (NO in step S206), the CPU 101 repeats the determination in step S206.

Otherwise, when determining that the current TTC is equal to or smaller than the reference TIC RTc1 (YES in step S206), the CPU 101 sends an instruction signal to the braking assist unit 32 in step S208. The instruction signal instructs the braking assist unit 32 to execute the braking assist task that performs (1) A brake-assist function of increasing the braking force by the value of the braking force BF1, or (2) An automatic brake function of automatically braking the vehicle 500 by the braking force BF1 if there is no braking operation by the driver Thereafter, the CPU 101 determines whether the current TIC is equal to or smaller than the reference TIC RTd1 in step S210.

When determining that the current TIC is not equal to or smaller than the reference TIC RTd1 (NO in step S210), the CPU 101 repeats the determination in step S210.

Otherwise, when the current TTC is equal to or smaller than the reference TIC RTd1 (YES in step S210), the CPU 101 sends an instruction signal to the steering assist unit 31 in step S212. The instruction signal instructs the steering assist unit 31 to execute the steering assist task that performs (1) A steering assist function of assisting a driver's steering operation of the steering wheel 504 of the vehicle 500 by the value of the steering angle θ1, or (2) An automatic steering function of automatically steering the vehicle 500 by the value of the steering angle θ1 if there is no steering operation by the driver.

In step S100 of each cycle of the cruise-assist mode control routine, when the CPU 101 determines that the at least one target object is not detected based on the at least one of the measurement signals, i.e. is no longer detected based on at least one of the measurement signals (NO in step S100), the CPU 101 determines whether the pedestrian recognition flag Fp has been set to 1 in step S108.

Upon determining that the pedestrian recognition flag Fp has been set to 1 (YES in step S108), the CPU 101 determines that at least one target object was recognized as a pedestrian in the immediately previous cycle of the cruise-assist mode control routine. Then, the CPU 101 determines whether the two-wheel vehicle detection flag Ft is set to 1 in step S110.

Upon determining that the two-wheel vehicle detection flag Ft is set to 0 (NO in step S110), the CPU 101 determines, as the assist mode of the control apparatus 100, the pedestrian assist-mode maintenance mode in step S112. Thereafter, the CPU 101 terminates the current cycle of the cruise assist routine, and performs the next cycle of the cruise assist routine after lapse of the predetermined period.

During the pedestrian assist-mode maintenance mode determined by the CPU 101, the CPU 101 maintains the pedestrian assist mode and continuously executes the cruise assist subroutine (see steps S200 to S210) in, for example, the following first and second cases where (1) No target objects are detected in the current routine of the cruise-assist mode control routine after at least one detected target object was recognized as a pedestrian in the immediately previous routine of the cruise-assist mode control routine (2) At least one detected target object is not recognized as a pedestrian in the current routine of the cruise-assist mode control routine after at least one detected target object was recognized as a pedestrian in the immediately previous routine of the cruise-assist mode control routine That is, as described above, the reference TTCs RTb1, RTc1, and RTd1 are kept as the execution timings of the respective warning assist task, braking assist task, and steering assist task. Similarly, the value BF1 of the braking force and the value θ1 of the steering angle are kept as the assist quantities of the respective braking assist task and steering assist task.

As an example of the first case, although at least one target object was detected and recognized as a pedestrian when the vehicle 500 was travelling in no back-light environment in the immediately previous cycle of the cruise-assist control routine, the at least one target object disappears due to back-light when the vehicle 500 is travelling in back-light environment in the current cycle of the assist mode control routine.

Additionally, as an example of the second case, although at least one target object was detected and recognized as a pedestrian when the vehicle 500 was parked in the immediately previous cycle of the cruise-assist control routine, the at least one target object disappears when the at least one target object is entering the body of the vehicle 500 in the current cycle of the assist mode control routine.

Figure 8:
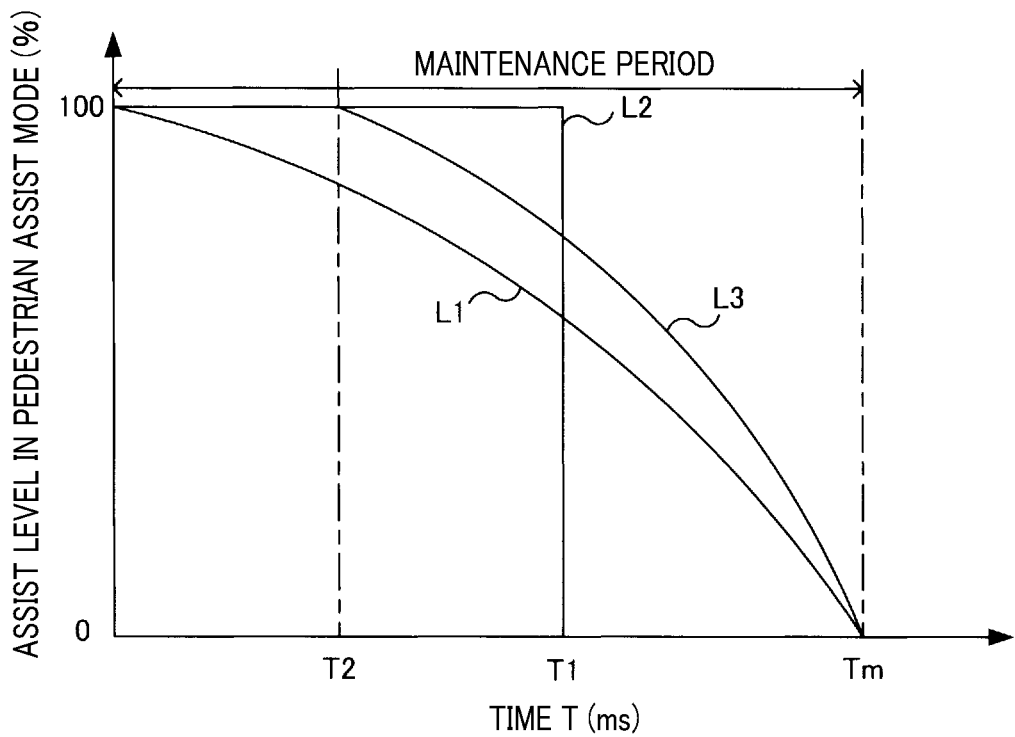
FIG. 8 is a graph schematically illustrating how to control at least one of assist levels in a pedestrian assist-mode maintenance mode.

The pedestrian assist-mode maintenance mode represents that the CPU 101 should maintain 100 percent of at least one of the assist levels of each of the cruise assist tasks based on the pedestrian assist mode for a predetermined maintenance period Tm, such as 1 second (see FIG. 8). As descried above, the assist levels of, for example, the braking assist task based on the pedestrian assist mode include the execution timing, i.e. the reference TTC RTc1, of the braking assist task, and the assist quantity, i.e. the braking force BF1, of the braking assist task (see FIG. 5).

That is, the CPU 101 continuously executes the cruise assist subroutine based on the pedestrian assist mode (see FIG. 4).

Otherwise, upon determining that the two-wheel vehicle detection flag Ft is set to 1 (YES in step S110), the CPU 101 alters, i.e. reduces, a maintenance level of the pedestrian assist mode in the pedestrian assist-mode maintenance mode in step S114; the maintenance level of the pedestrian assist mode is at least one parameter of the pedestrian assist mode.

As described above and as illustrated in FIG. 6, the image of a pedestrian and the image of a two-wheel vehicle on which a rider is riding are similar to each other. In particular, the image of a pedestrian and the image of the front or back of a two-wheel vehicle on which a rider is riding are closely similar to each other.

For this reason, the pattern matching processing between the current captured image and the feature pattern images for pedestrians may erroneously recognize a two-wheel vehicle on which a rider is riding as a pedestrian in step S102.

For addressing such an issue, upon determining that the at least one detected target object was recognized as a pedestrian in step S102 in the immediately previous cycle of the cruise-assist mode control routine, and that a two-wheel vehicle located close to the at least one target object recognized as a pedestrian was detected in steps S105a and S110 in the immediately previous cycle of the cruise-assist mode control routine, the CPU 101 is configured to reduce the maintenance level of the pedestrian assist mode in the pedestrian assist-mode maintenance mode. This aims to reduce or prevent excessive execution of the warning assist task, braking assist task, and/or the steering assist task.

Note that the maintenance level of the pedestrian assist mode in the pedestrian assist-mode maintenance mode of the control apparatus 100 represents at least one of (1) The maintenance period Tm of execution of the pedestrian assist-mode maintenance mode (2) At least one of the assist levels of each of the cruise assist tasks in the pedestrian assist-mode maintenance mode.

Specifically, the CPU 101 is configured to, as an operation to reduce the maintenance level of the pedestrian assist mode in the pedestrian assist-mode maintenance mode, execute, in step S114, an operation to reduce at least one of the assist levels of each of the cruise assist tasks from 100 percent to 0 percent over time while the maintenance period Tm is kept unchanged (see curve L1 in the graph of FIG. 8).

As another example, the CPU 101 is configured to execute, in step S114, an operation to reduce the maintenance period Tm by (1) Maintaining the assist levels of each of the cruise assist tasks at 100 percent up to an elapsed time T1 since the start of the pedestrian assist-mode maintenance mode (2) Cancelling the pedestrian assist-mode maintenance mode at the elapsed time T1; the elapsed time T1 is smaller than the maintenance period Tm (see curve L2 in the graph of FIG. 8)

Note that the graph of FIG. 8 has the elapsed time since the start of the pedestrian assist-mode maintenance mode as its horizontal axis, and the assist levels of each of the cruise assist tasks based on the pedestrian assist mode.

Reducing at least one of the assist levels of, for example, the braking assist task by the CPU 101 means at least one of (1) Reducing the assist quantity, i.e. the braking force, BF1 of the braking assist task (2) Delaying the execution timing RTc1 of the braking assist task Similarly, reducing at least one of the assist levels of, for example, the steering assist task by the CPU 101 means at least one of (1) Reducing the assist quantity, i.e. the braking force, BF2 of the steering assist task (2) Delaying the execution timing RTd1 of the steering assist task Moreover, reducing at least one of the assist levels of, for example, the warning assist task by the CPU 101 means at least one of (1) Reducing the assist quantity, i.e. the luminance level, WL1 of the displayed warning information or the level, WL1 of the audibly output warning information, of the warning assist task (2) Delaying the execution timing RTb1 of the warning assist task If the informing device 50 is configured to frequently blink the luminance level of the displayed visible warning information, it is possible to reduce the frequency of the blink of the luminance level of the displayed visible warning information as reducing the assist quantity of the warning assist task.

Additionally, if the informing device 50 is configured to frequently output the audible warning information, it is possible to reduce the frequency of the output of the audible warning information as reducing the assist quantity of the warning assist task.

That is, when determining that the at least one detected target object was recognized as a pedestrian in step S102 in the immediately previous cycle of the cruise-assist mode control routine, and that a two-wheel vehicle located close to the at least one target object recognized as a pedestrian was detected in steps S105a and S110 in the immediately previous cycle of the cruise-assist mode control routine, the control apparatus 100 determines that the two-wheel vehicle on which a rider is riding is likely to be erroneously recognized as a pedestrian.

Then, the control apparatus 100 reduces the maintenance level of the pedestrian assist mode in the pedestrian assist-mode maintenance mode in step S114, thus reducing the frequency of execution of at least one of the cruise assist tasks and/or the assist quantity of at least one of the cruise assist tasks. This therefore makes it possible to reduce or prevent unnecessary execution of the cruise assist tasks if there is a high possibility of a two-wheel vehicle on which a rider is riding being erroneously recognized as a pedestrian.

In step S114, if the execution timing of the current cycle of the assist mode control routine is within a night-time period or at least one target object detected in step S100 looks to be partially overlapped with another object when viewed from the vehicle 500, the CPU 101 can be configured to make smaller the degree of reduction of the assist levels of each of the cruise assist tasks, thus limiting or preventing reduction of the assist levels of each of the cruise assist tasks.

For example, in step S114, the CPU 101 is configured to (1) Maintain the assist levels of each of the cruise assist tasks at 100 percent up to an elapsed time T2 since the start of the pedestrian assist-mode maintenance mode (2) Reduce at least one of the assist levels of each of the cruise assist tasks from 100 percent to 0 percent over time while the maintenance period Tm is kept unchanged (see curve L3 in the graph of FIG. 8)

Usually, the accuracy of recognizing a detected target object as a pedestrian by the CPU 101 may be reduced when (1) The recognition time is within a night-time period as a first example case or (2) The detected target object looks to be partially overlapped with another object when viewed from the vehicle 500 as a second example case.

From this viewpoint, as described above, the CPU 101 is configured to maintain 100 percent of the assist levels of each of the cruise assist tasks up to the elapsed time T2, and thereafter reduce the assist levels of each of the cruise assist tasks.

This configuration therefore achieves both (1) Avoidance of a collision between the vehicle 500 and at least one target object recognized as a pedestrian (2) Unnecessary execution of the cruise assist tasks if there is a high possibility of a two-wheel vehicle on which a rider is riding being erroneously recognized as a pedestrian Note that the CPU 101 is capable of (1) Determining whether the ambient illuminance around the vehicle 500 obtained based on the measurement signal output from the illuminance sensor 27 is equal to or lower than a predetermined illuminance level (2) Determining whether the execution timing of the current cycle of the assist mode control routine is within a night-time period depending on whether the ambient illuminance around the vehicle 500 is equal to or lower than the predetermined illuminance level That is, the CPU 101 determines that the execution timing of the current cycle of the assist mode control routine is within the night-time period upon determining that the ambient illuminance around the vehicle 500 is equal to or lower than the predetermined illuminance level.

The CPU 101 is also capable of determining whether at least one target object detected in step S100 looks to be partially overlapped with another object when viewed from the vehicle 500 in accordance with at least one of the measurement signals sent from the respective millimeter-wave radars 21 and the camera 24.

Otherwise, upon determining that the pedestrian recognition flag Fp has not been set to 1 (NO in step S108), the CPU 101 determines that at least one detected target object was not recognized as a pedestrian in the immediately previous cycle of the cruise-assist mode control routine. This results in the CPU 101 determining that no target objects are reliably located within the detection region, thus terminating the current cycle of the cruise assist routine. Thereafter, the CPU 101 performs the next cycle of the cruise assist routine after lapse of the predetermined period.

In addition, upon determining that the at least one target object is not recognized as a pedestrian (NO in step S102), the CPU 101 determines whether an elapsed period Tp since the time at which at least one target object detected in step S100 was lastly recognized as a pedestrian has exceeded a predetermined reference period Tr in step S116.

Specifically, one reason why at least one detected target object is not recognized as a pedestrian is that it is finally determined that no pedestrians are located in front of the vehicle 500. From this viewpoint, the reference period Tr is defined such that, after at least the reference period Tr has elapsed since at least one detected target object was recognized as a pedestrian, it can be finally determined that no pedestrians are located within the detection region in front of the vehicle 500.

That is, upon determining that the elapsed period Tp since the time at which at least one target object detected in step S100 was lastly recognized as a pedestrian has not exceeded the reference period Tr (NO in step S116), the CPU 101 executes the operation in step S110 and the following operations from the operation in step S110.

Because the reference period Tr has not elapsed since the time at which at least one target object detected in step S100 was lastly recognized as a pedestrian, it cannot be finally determined that no pedestrians are located within the detection region in front of the vehicle 500. This therefore results in the CPU 101 executing the pedestrian assist-mode maintenance mode in step S112 or S114, which is programmed to be carried out if no target objects are recognized as pedestrians after at least one target object has been recognized as a pedestrian, because it cannot be finally determined that no pedestrians are located within the detection region in front of the vehicle 500.

This therefore makes it possible to continuously maintain the pedestrian assist mode even if at least one detected target object recognized as a pedestrian temporarily disappears, thus reliably avoiding a collision between the vehicle 500 and the at least one target object recognized as a pedestrian.

Otherwise, upon determining that the elapsed period Tp since the time at which at least one target object detected in step S100 was lastly recognized as a pedestrian has exceeded the reference period Tr (YES in step S116), the CPU 101 sets the pedestrian recognition flag Fp to OFF, i.e. 0, or holds the pedestrian recognition flag Fp being 0 in step S118, and determines the non-pedestrian assist mode for each of the cruise target tasks as the assist mode of the control apparatus 100 in step S120.

Specifically, in step S120, the CPU 101 sets (1) The execution timings of the warning assist task, braking assist task, and steering assist task to the respective reference TTCs RTb2, RTc2, and RTd2 in the non-pedestrian assist mode (2) The assist quantities of the warning assist task, braking assist task, and steering assist task to the respective values WL2, BF2, and θ2 in the non-pedestrian assist mode (see FIG. 5)

The execution timings TTCs RTb2, RTc2, and RTd2 of the respective warning assist task, braking assist task, and steering assist task in the non-pedestrian assist mode are later than the execution timings TTCs RTb1, RTc1, and RTd1 of the respective warning assist task, braking assist task, and steering assist task in the pedestrian assist mode. For this reason, it is possible to reduce the frequency of execution of the warning assist task, braking assist task, and steering assist task in the non-pedestrian assist mode to be lower than the frequency of execution of the warning assist task, braking assist task, and steering assist task in the pedestrian assist mode.

Additionally, the assist quantities WL2, BF2, and θ2 of the respective warning assist task, braking assist task, and steering assist task in the non-pedestrian assist mode are lower than the assist quantities WL1, BF1, and θ1 of the respective warning assist task, braking assist task, and steering assist task in the pedestrian assist mode.

This therefore reduces the number of times the driver of the vehicle 500 has a feeling of discomfort while avoiding or reducing collisions of the vehicle 500 with target objects, such as other vehicles or obstacles, other than pedestrians.

As described above, the cruise assist system 10 according to the first embodiment is configured to execute the pedestrian assist-mode maintenance mode that maintains the pedestrian assist mode if at least one target object, which has been detected and recognized as a pedestrian, is not continuously detected or not continuously recognized as a pedestrian.

This configuration makes it possible to continuously maintain the pedestrian assist mode even if at least one detected target object recognized as a pedestrian temporarily disappears, thus reliably avoiding a collision between the vehicle 500 and the at least one target object recognized as a pedestrian.

The cruise assist system 10 according to the first embodiment is specially configured to reduce the maintenance level of the pedestrian assist mode in the pedestrian assist-mode maintenance mode if a two-wheel vehicle has been detected close to the at least one detected target object.

That is, if the two-wheel vehicle has been detected close to the at least one detected target object recognized as a pedestrian, the two-wheel vehicle on which a rider is riding is likely to be erroneously recognized as a pedestrian.

For this reason, this special configuration of the cruise assist system 10 reduces the frequency of execution of at least one of the cruise assist tasks and/or the assist quantity of at least one of the cruise assist tasks. This therefore makes it possible to reduce or prevent unnecessary execution of the cruise assist tasks if there is a high possibility of a two-wheel vehicle on which a rider is riding being erroneously recognized as a pedestrian.

In particular, this special configuration of the cruise assist system 10 delays the execution timings of the respective cruise assist tasks and/or reduces the assist quantities of the respective cruise assist tasks. This results in reduction of the frequency of execution of at least one of the cruise assist tasks and/or reduction of the assist quantity of at least one of the cruise assist tasks. This therefore makes it possible to reduce the number of times the driver of the vehicle 500 has a feeling of discomfort while avoiding or reducing collisions of the vehicle 500 with target objects, such as other vehicles or obstacles, other than pedestrians.

Note that the CPU 101 is configured to execute, for example, the operations in steps S105a, S105b, and S108 to S114 in the cruise assist routine illustrated in FIG. 3 in accordance with the assist mode control program P2, and execute, for example, the other operations in the cruise assist routine illustrated in FIG. 3 in accordance with the cruise assist control program P1.

For example, the operations in steps S104, S116, and S118 have been added to the cruise assist routine for supporting the operation in step S114.

The CPU 101 can be configured to execute the operations in steps S108 to S114, i.e. maintain the pedestrian assist mode, if at least one detected target object has been recognized as a pedestrian for a predetermined period. Because the at least one detected target object has been recognized as a pedestrian for the predetermined period, there is a high possibility of the actual pedestrian being located within the detection region even if the actual pedestrian temporarily disappears. For this reason, the CPU 101 can be configured to maintain the pedestrian assist mode even if the at least one target object that has been recognized as a pedestrian is not detected (see the operations in steps S100, and S108 to S114). This configuration makes it possible to more reliably avoid or reduce collisions of the vehicle 500 with pedestrians.

Second Embodiment

The following describes the second embodiment of the present disclosure. The second embodiment differs from the first embodiment in the following points. So, the following mainly describes the different points, and omits or simplifies descriptions of like parts between the first and second embodiments, to which identical or like reference characters are assigned, thus eliminating redundant description.

The CPU 101 according to the first embodiment determines, based on the measurement signal, i.e. the captured frame image, sent from the camera 24, whether at least one two-wheel vehicle is located close to the at least one target object recognized as a pedestrian in accordance with the measurement signal, i.e. the captured frame image, sent from the camera 24 using pattern matching processing.

In contrast, the CPU 101 according to the second embodiment determines, based on the measurement signal sent from each millimeter-wave radar 21.

For example, the memory unit 102 stores an echo intensity pattern dictionary D2. The echo intensity pattern dictionary D2 includes typical intensity patterns of echoes, i.e. reflected waves, generated based on reflection of transmitted radar waves from various types of two-wheel vehicles.

In step S105a, the CPU 101 obtains, from the measurement signals sent from each millimeter-wave radar 21, the pattern of the intensities of the echoes from a target object. Then, in step S105a, the CPU 101 determines whether or not the pattern of the intensities of the echoes from the target object is substantially identical to or similar to one of the intensity patterns stored in the echo intensity pattern dictionary D2.

Upon the pattern of the intensities of the echoes from the target object is substantially identical to or similar to one of the intensity patterns stored in the echo intensity pattern dictionary D2, and a speed of the target object is equal to or higher than a predetermined threshold speed, the CPU 101 determines that the target object is a two-wheel vehicle located within the detection region of the vehicle 500 (YES in step S105a). Note that the CPU 101 can calculate the speed of the target object based on, for example, the relative speed of the target object included in the measurement signals and the travelling speed of the vehicle 500 obtained based on the measurement signal sent from each wheel speed sensor 25.

As described above, the CPU 101 according to the second embodiment is configured to (1) Execute determination of whether at least one target object is recognized as a pedestrian using pattern matching processing (2) Execute determination of whether a two-wheel vehicle is located close to the at least one target object recognized as a pedestrian using the measurement signals sent from each millimeter-wave radar 21

This configuration enables determination of whether a two-wheel vehicle is located close to the at least one target object recognized as a pedestrian to be carried out while reducing the computation load of the CPU 101 based on the pattern matching processing.

In step S105a, the CPU 101 can be configured to determine whether a two-wheel vehicle is located close to the at least one target object recognized as a pedestrian based on both the measurement signal sent from the camera 24 and the measurement signals sent from each millimeter-wave radar 21.

Third Embodiment

The following describes the third embodiment of the present disclosure. The third embodiment differs from the first embodiment in the following points. So, the following mainly describes the different points, and omits or simplifies descriptions of like parts between the first and third embodiments, to which identical or like reference characters are assigned, thus eliminating redundant description.

Each of the first and second embodiments determines whether a two-wheel vehicle is located close to the at least one target object recognized as a pedestrian independently of the positional relationship between the two-wheel vehicle and the vehicle 500. Whether at least one target object is accurately recognized as a pedestrian depends on how the two-wheel vehicle is located with respect to the vehicle 500.

Figure 9A:
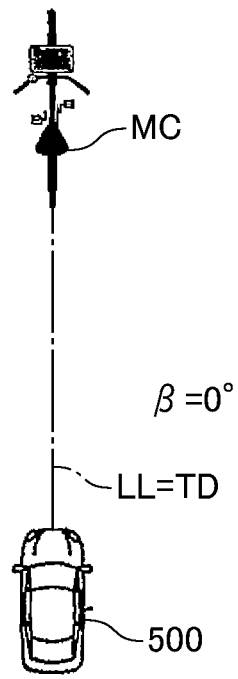
FIGS. 9A and 9B are a joint view schematically illustrating an angle defined between a longitudinal line of a two-wheel vehicle and a line extending parallel to a travelling direction of the vehicle according to the third embodiment of the present disclosure.
Figure 9B:
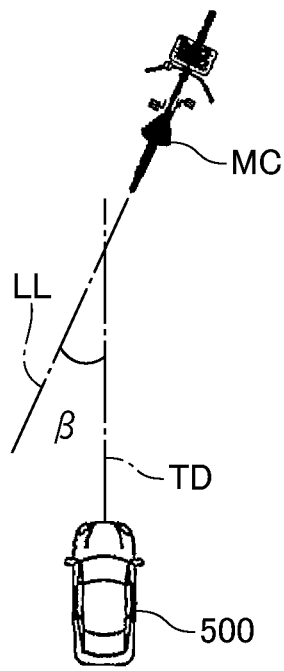
Figure 10:
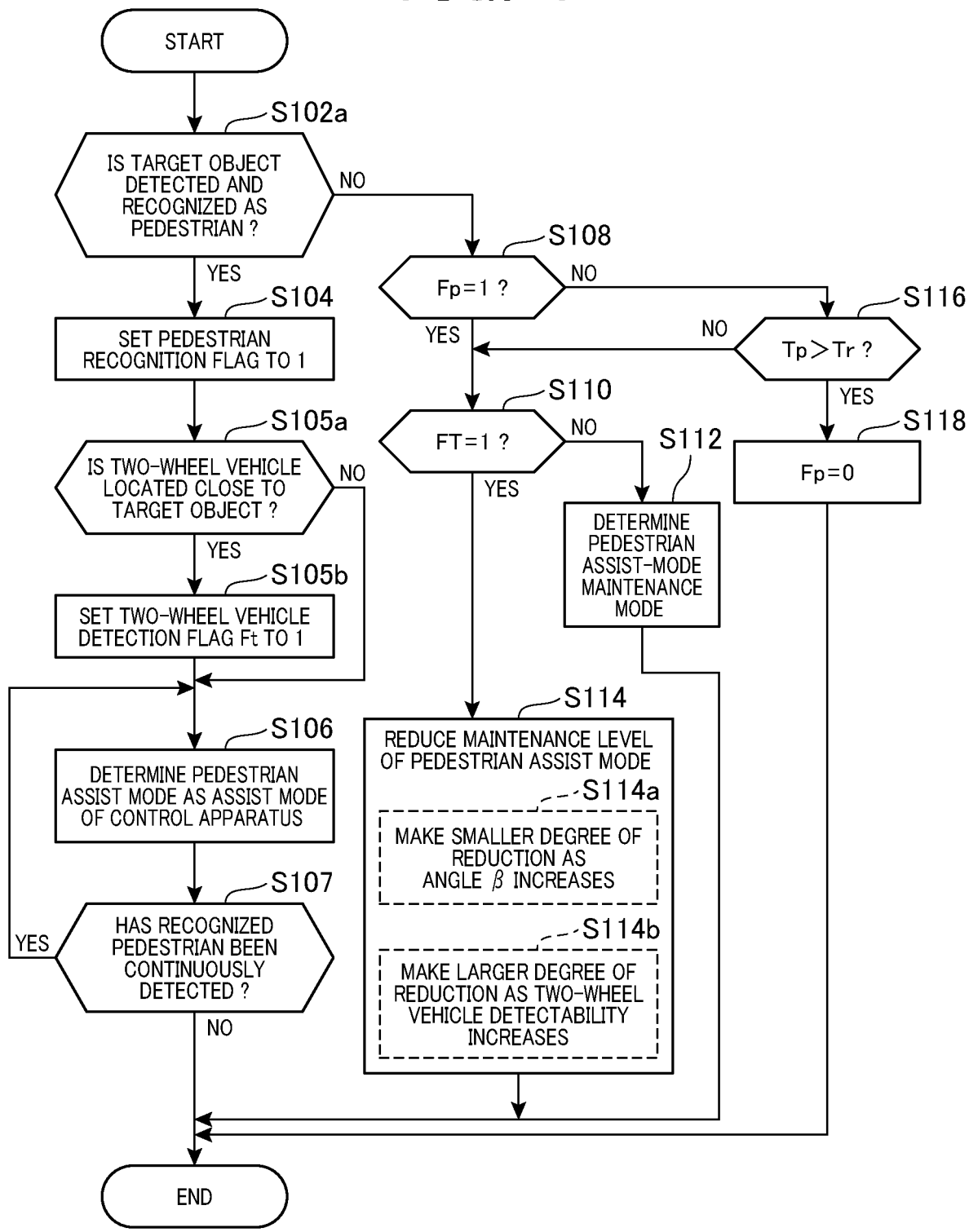
FIG. 10 is a flowchart schematically illustrating an example of a modified cruise assist subroutine executed by the control apparatus according to the fifth embodiment of the present disclosure.

For example, as illustrated in FIGS. 9A and 9B, an angle β is defined between a longitudinal line LL of a two-wheel vehicle MC and a line TD extending parallel to the travelling direction of the vehicle 500.

If the two-wheel vehicle MC is travelling parallel to the travelling direction of the vehicle 500 (see FIG. 9A), the longitudinal line LL of the two-wheel vehicle MC is parallel to the line TD extending parallel to the travelling direction of the vehicle 500, resulting in the angle β being zero degrees.

In contrast, if the two-wheel vehicle MC is turning, the angle β is increasing (FIG. 9B), so that a side of the two-wheel vehicle MC can be taken in a captured image. That is, an increase in the angle β defined between the longitudinal line LL of the two-wheel vehicle MC and the line TD extending parallel to the travelling direction of the vehicle 500 causes a portion of the two-wheel vehicle MC taken in a captured image to shift from the front or back of the two-wheel vehicle MC to a right side or left side of the two-wheel vehicle MC.

The similarity between the image of a pedestrian and the image of the front or back of a two-wheel vehicle is usually higher than the similarity between the image of a pedestrian and the image of the right side or left side of a two-wheel vehicle. For this reason, the image of the right or left side of a two-wheel vehicle is clearly distinguishable from the feature pattern images of pedestrians based on pattern matching processing. That is, even if a two-wheel vehicle is located close to at least one target object, pattern matching processing between the feature pattern images of pedestrians and a captured image including the at least one target object and the right or left side of a two-wheel vehicle clearly distinguishes the right or left side of the two-wheel vehicle from the feature pattern images of pedestrians.

To sum up, the larger the angle β defined between the longitudinal line LL of the two-wheel vehicle MC and the line TD extending parallel to the travelling direction of the vehicle 500 is, the lower the possibility of the erroneous recognition of a two-wheel vehicle on which a rider is riding is.

From these viewpoints, the CPU 101 according to the third embodiment is configured to make smaller the degree of reduction of the maintenance level of the pedestrian assist mode as the angle β defined between the longitudinal line LL of the two-wheel vehicle MC and the line TD extending parallel to the travelling direction of the vehicle 500 increases in step S114a. This therefore results in reliable maintenance of the cruise assist tasks for pedestrians even if a two-wheel vehicle is located close to at least one target object recognized as a pedestrian.

Fourth Embodiment

The following describes the fourth embodiment of the present disclosure. The fourth embodiment differs from the first embodiment in the following points. So, the following mainly describes the different points, and omits or simplifies descriptions of like parts between the first and fourth embodiments, to which identical or like reference characters are assigned, thus eliminating redundant description.

The CPU 101 according to the fourth embodiment is configured to determine whether at least one two-wheel vehicle, such as a motor cycle or a bicycle, is located close to the at least one target object recognized as a pedestrian in consideration of a two-wheel vehicle detectability in step S105a.

The two-wheel vehicle detectability represents a parameter indicative of a level of the detectability of two-wheel vehicles that are similar objects for pedestrians.

For example, the CPU 101 increases the two-wheel vehicle detectability as an accumulated time for which a two-wheel vehicle has been detected increases. As another example, the CPU 101 increases the two-wheel vehicle detectability as an accumulated number of times a two-wheel vehicle has been detected increases. As a further example, the CPU 101 increases the two-wheel vehicle detectability when detecting a two-wheel vehicle based on both the measurement signal sent from the camera 24 and the measurement signals sent from each millimeter-wave radar 21 to be higher than the two-wheel vehicle detectability when detecting a two-wheel vehicle based on the measurement signal sent from the camera 24.

That is, the larger the two-wheel vehicle detectability is, the higher the possibility of the erroneous recognition of a two-wheel vehicle on which a rider is riding is.

From this viewpoint, the CPU 101 according to the fourth embodiment is configured to make larger the degree of reduction of the maintenance level of the pedestrian assist mode as the two-wheel vehicle detectability increases in step S114b.

This configuration enables the degree of reduction of the braking force of the braking assist task and/or the steering angle of the steering assist task to increase. In addition, this configuration enables the execution timing of the braking assist task and/or the steering assist task to be further delayed. This therefore results in further reduction of the frequency of execution of at least one of the cruise assist tasks and/or reduction of the assist quantity of at least one of the cruise assist tasks. This therefore makes it possible to further reduce the number of times the driver of the vehicle 500 has a feeling of discomfort.

Fifth Embodiment

The following describes the fifth embodiment of the present disclosure. The fifth embodiment differs from the first embodiment in the following points. So, the following mainly describes the different points, and omits or simplifies descriptions of like parts between the first and fifth embodiments, to which identical or like reference characters are assigned, thus eliminating redundant description.

The CPU 101 according to the first embodiment is configured to perform cruise assist routine, which is designed as a general cruise assist routine.

In contrast, the CPU 101 according to the fifth embodiment is configured to perform a modified cruise assist routine for pedestrians as limited target objects to be detected, which is illustrated in FIG. 9.

Specifically, as illustrated in FIG. 9, the CPU 101 determines, based on at least one of the measurement signals currently sent from the respective millimeter-wave radars 21 and the camera 24, whether at least one pedestrian is detected and recognized based on at least one of the measurement signals in step S102a. That is, in step S102a, the CPU 101 determines, based on the measurement signals currently sent from the respective millimeter-wave radars 21 and the camera 24, whether at least one target object is located within the predetermined detection region, and the at least one target object is recognized as a pedestrian when determining that at least one target object is located within the predetermined detection region.

In particular, upon determining that the at least one target object is not recognized as a pedestrian (NO in step S102), the CPU 101 is programmed to perform the determination of whether the pedestrian recognition flag Fp has been set to 1 in step S108.

In addition, the pedestrian recognition flag Fp has not been set to 1 (NO in step S108), the CPU 101 determines that at least one detected target object was not recognized as a pedestrian in the immediately previous cycle of the cruise-assist mode control routine. At that time, the CPU 101 according to the fifth embodiment is programmed to determine whether the elapsed period Tp since the time at which at least one target object detected in step S100 was lastly recognized as a pedestrian has exceeded the reference period Tr in step S116.

The other operations in the modified cruise assist routine are substantially similar to the corresponding operations in the cruise assist routine illustrated in FIG. 3.

This configuration of the cruise assist system 10 according to the fifth embodiment achieves substantially the same benefits as the benefits achieved by the cruise assist system 10 according to the first embodiment.

The CPU 101 according to the above embodiments is configured to execute the cruise assist control program P1 and the assist mode control program P2 to thereby implement the cruise assist controller 101a, but the present disclosure is not limited thereto. Specifically, at least one programmed hardware IC or at least one programmed hardware discrete circuit can be configured to implement the cruise assist controller 101a.

While the illustrative embodiments of the present disclosure have been described herein, the present disclosure is not limited to the embodiments and their modifications described herein, but includes any and all embodiments having modifications, omissions, combinations (e.g., of aspects across various embodiments), adaptations and/or alterations as would be appreciated by those in the art based on the present disclosure within the scope of the present disclosure.

For example, each of the technical features described in the embodiments and their modifications can be replaced with a known structure having the same function as the corresponding technical feature. Each of the technical features described in the embodiments and their modifications can also be combined with at least one of the other technical features. At least one of the technical features described in the embodiments and their modifications can further be eliminated unless the at least one of the technical features is described as an essential element in the present specification.

The present disclosure includes the following first to ninth application example.

The first application example corresponds to the cruise assist apparatus according to the first exemplary aspect.

A second application example is a cruise assist apparatus in which the cruise assist controller is configured to reduce the maintenance level of the pedestrian assist mode when the similar object is located close to the target object.

A third application example is a cruise assist apparatus in which the cruise assist controller is configured to determine whether a two-wheel vehicle on which a rider is riding is located as the similar object close to the target object upon it being determined that the target object is detected around the vehicle and recognized as a pedestrian.

A fourth application example is a cruise assist apparatus in which the cruise assist controller is configured to reduce, as the maintenance level of the pedestrian assist mode, the maintenance period of the pedestrian assist mode when the similar object is located close to the target object.

A fifth application example is a cruise assist apparatus in which the cruise assist controller is configured to reduce, as the maintenance level of the pedestrian assist mode, the assist level of the pedestrian assist mode when the similar object is located close to the target object.

A sixth application example is a cruise assist apparatus in which the cruise assist unit configured to perform, as the at least one task of assisting the cruise of the vehicle, a warning assist task of warning a driver of the vehicle, a braking assist task of assisting a braking of the vehicle, and a steering assist task of assisting a steering of the vehicle.

A seventh application example is a cruise assist apparatus in which the cruise assist controller is configured to control, as the maintenance level of the pedestrian assist mode, at least one of (1) An execution timing of the warning assist task
(2) An assist quantity of the warning assist task
(3) An execution timing of the braking assist task
(4) An assist quantity of the braking assist task
(5) An execution timing of the steering assist task
(6) An assist quantity of the steering assist task An eighth application example is a cruise assist apparatus in which the cruise assist controller is configured to reduce a degree of reduction of the maintenance level of the pedestrian assist mode when it is determined that the target object detected around the vehicle looks to be partially overlapped with another object when viewed from the vehicle.

A ninth application example is a cruise assist apparatus in which the cruise assist controller is configured to determine whether ambient illuminance around the vehicle is equal to or lower than a predetermined illuminance level, and make smaller a degree of reduction of the maintenance level of the pedestrian assist mode when it is determined that the ambient illuminance around the vehicle is equal to or lower than the predetermined illuminance level.

A tenth application example is a cruise assist apparatus in which the cruise assist controller is configured to make smaller a degree of reduction of the maintenance level of the pedestrian assist mode when the target object detected around the vehicle looks to be partially overlapped with another object when viewed from the vehicle.

An eleventh application example is a cruise assist apparatus in which the similar object has a length in a longitudinal direction thereof, and the cruise assist controller is configured to make smaller the degree of reduction of the maintenance level of the pedestrian assist mode as an angle defined between the longitudinal direction of the similar object and a line extending a travelling direction of the vehicle increases.

A twelfth application example is a cruise assist apparatus in which the cruise assist controller is configured to make larger the degree of reduction of the maintenance level of the pedestrian assist mode as a level of a detectability of the similar object increases.

A thirteenth application example is a cruise assist apparatus in which the cruise assist controller is configured to keep unchanged the maintenance level of the pedestrian assist mode when the similar object is not located close to the target object.

What is claimed is:

1. A cruise assist apparatus for a vehicle, the cruise assist apparatus comprising:
    a processor;
    a non-transitory computer-readable storage medium; and
    a set of computer-executable instructions stored on the non-transitory computer-readable storage medium that cause the processor to:
    determine whether a target object is detected around the vehicle and recognized as a pedestrian;
    perform at least one task of assisting a cruise of the vehicle; and
    set a pedestrian assist mode upon determining that the target object is detected around the vehicle and recognized as a pedestrian, the pedestrian assist mode having an assist level set to be suitable for the target object being recognized as a pedestrian;
    determine whether a similar object that is similar to a pedestrian is located close to the target object upon determining that the target object is detected around the vehicle and recognized as a pedestrian;
    maintain the pedestrian assist mode for a predetermined maintenance period even upon determining that the recognized pedestrian is no longer detected; and
    alter at least one parameter of the pedestrian assist mode based on whether the similar object is located close to the target object, wherein:
    the at least one parameter to be altered is a maintenance level of the pedestrian assist mode, and
    the set of computer-executable instructions further cause the processor to reduce the maintenance level of the pedestrian assist mode in response to determining that the similar object is located close to the target object.

2. The cruise assist apparatus according to claim 1, wherein:
    the set of computer-executable instructions further cause the processor to determine whether a two-wheel vehicle on which a rider is riding is located as the similar object close to the target object upon determining that the target object is detected around the vehicle and recognized as a pedestrian.

3. The cruise assist apparatus according to claim 1, wherein:
    the set of computer-executable instructions further cause the processor to reduce the maintenance period of the pedestrian assist mode when it is determined that the similar object is located close to the target object.

4. The cruise assist apparatus according to claim 1, wherein:
    the set of computer-executable instructions further cause the processor to reduce the assist level of the pedestrian assist mode when it is determined that the similar object is located close to the target object.

5. The cruise assist apparatus according to claim 1, wherein:
    the set of computer-executable instructions further cause the processor to perform, as the at least one task of assisting the cruise of the vehicle, at least one of a warning assist task of warning a driver of the vehicle, a braking assist task of assisting a braking of the vehicle, and a steering assist task of assisting a steering of the vehicle.

6. The cruise assist apparatus according to claim 5, wherein:
the set of computer-executable instructions further cause the processor to control, as the maintenance level of the pedestrian assist mode, at least one of:
an execution timing of the warning assist task;
an assist quantity of the warning assist task;
an execution timing of the braking assist task;
an assist quantity of the braking assist task;
an execution timing of the steering assist task; and
an assist quantity of the steering assist task.

7. The cruise assist apparatus according to claim 1, wherein:
the set of computer-executable instructions further cause the processor to reduce a degree of reduction of the maintenance level of the pedestrian assist mode when it is determined that the target object detected around the vehicle appears to be partially overlapped with another object when viewed from the vehicle.

8. The cruise assist apparatus according to claim 1, wherein:
the set of computer-executable instructions further cause the processor to:
determine whether ambient illuminance around the vehicle is equal to or lower than a predetermined illuminance level; and
make smaller a degree of reduction of the maintenance level of the pedestrian assist mode when it is determined that the ambient illuminance around the vehicle is equal to or lower than the predetermined illuminance level.

9. The cruise assist apparatus according to claim 1, wherein:
the similar object has a length in a longitudinal direction thereof; and
the set of computer-executable instructions further cause the processor to make smaller a degree of reduction of the maintenance level of the pedestrian assist mode as an angle defined between the longitudinal direction of the similar object and a line extending a travelling direction of the vehicle increases.

10. The cruise assist apparatus according to claim 1, wherein:
the set of computer-executable instructions further cause the processor to make larger a degree of reduction of the maintenance level of the pedestrian assist mode as a level of a detectability of the similar object increases.

11. The cruise assist apparatus according to claim 1, wherein:
the set of computer-executable instructions further cause the processor to keep the pedestrian assist mode when it is determined that the similar object is not located close to the target object.

12. A cruise assist method for performing a cruise assist of a vehicle, the cruise assist method comprising:
determining whether a target object is detected around the vehicle and recognized as a pedestrian;
controlling the cruise assist of the vehicle to be performed in a pedestrian assist mode upon determining that the target object is detected around the vehicle and recognized as a pedestrian, the pedestrian assist mode having an assist level set to be suitable for the target object being recognized as a pedestrian;
determining whether a similar object that is similar to a pedestrian is located close to the target object upon determining that the target object is detected around the vehicle and recognized as a pedestrian;
maintaining the pedestrian assist mode for a predetermined maintenance period even upon the recognized pedestrian no longer being detected; and
altering at least one parameter of the pedestrian assist mode based on whether the similar object is located close to the target object, wherein:
the at least one parameter to be altered is a maintenance level of the pedestrian assist mode, and
the altering step reduces the maintenance level of the pedestrian assist mode in response to determining that the similar object is located close to the target object.

13. A cruise assist controller as part of a cruise assist apparatus for a vehicle, the cruise assist apparatus configured to determine whether a target object is detected around the vehicle and recognized as a pedestrian, and the cruise apparatus configured to perform at least one task of assisting a cruise of the vehicle, the cruise assist controller comprising:
a processor;
a non-transitory computer-readable storage medium; and
a set of computer-executable instructions stored on the computer-readable storage medium that cause the processor to implement:
controlling the cruise assist apparatus to perform cruise assist in a pedestrian assist mode upon it being determined that the target object is detected around the vehicle and recognized as a pedestrian, the pedestrian assist mode having an assist level set to be suitable for the target object being recognized as a pedestrian;
determining whether a similar object that is similar to a pedestrian is located close to the target object upon it being determined that the target object is detected around the vehicle and recognized as a pedestrian;
maintaining the pedestrian assist mode for a predetermined maintenance period even upon it being determined that the recognized pedestrian is no longer detected by the cruise assist apparatus; and
altering at least one parameter of the pedestrian assist mode based on whether the similar object is located close to the target object, wherein:
the at least one parameter to be altered is a maintenance level of the pedestrian assist mode, and
the set of computer-executable instructions further cause the processor to reduce the maintenance level of the pedestrian assist mode when in response to determining that the similar object is located close to the target object.

* * * * *